Patented May 2, 1950

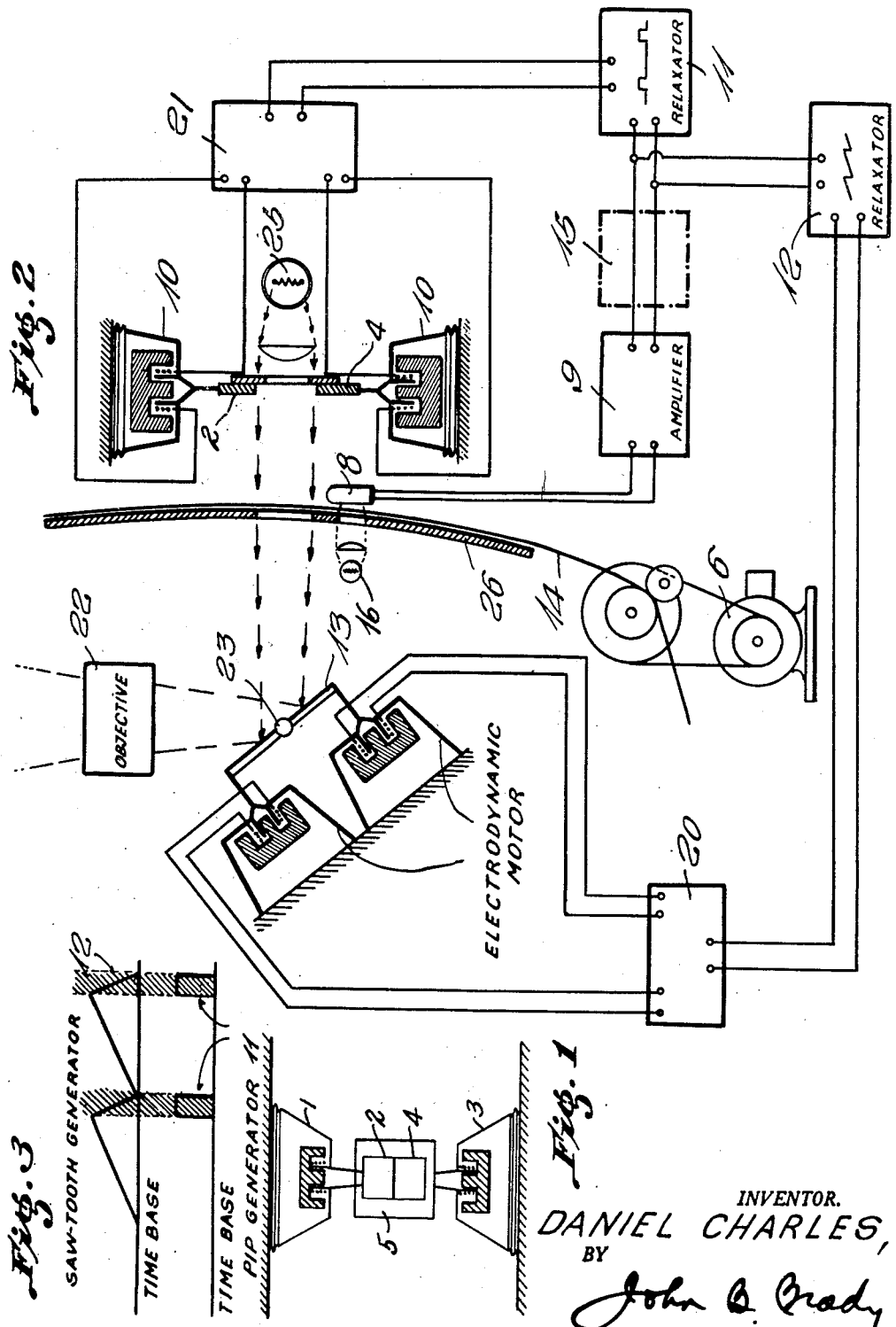

2,506,198

UNITED STATES PATENT OFFICE 2,506,198

CONTINUOUSLY MOVING FILM PROJECTING DEVICE FOR MOVING PICTURE INSTALLATIONS

Daniel Charles, Paris, France, assignor to Compagnie Generale de T. S. F., a corporation of France Application June 17, 1947, Serial No. 755,035
In France June 17, 1946

4 Claims. (Cl. 88—16.8)

My invention relates to improvements afforded to the projecting devices used in the moving picture installations. It is well known that, in moving picture projectors, the pictures are moved at a speed of 24 per second, each one of them remaining stationary, for instance, during 5/144 of a second, and taking 1/144 of a second for leaving the place to the next picture. It is well known, moreover, that the irregular displacement of the film is usually obtained by means of a delicate mechanism including essentially a Maltese cross.

An important simplification may be afforded to the said mechanism by the adoption of a continuous unrolling of the moving picture film; but it is then necessary to secure the fixity of the picture projection by means of an auxiliary mirror, and to also secure a constant unrolling speed so as to obtain that the shuttter operates at the desired moments.

Now, the frequencies which are in use in the succession of the pictures are dependent on the electrical low frequency technics rather than on the mechanical, which latter submit the parts of the mechanisms to a great deal of wear and tear, while being called, moreover, to answer a great need of accuracy.

My invention refers mainly to the case of the continuously moved film, and it uses a combination of electric devices and kinds of connections which eliminate most of the mechanical intermediate means presently used in the projecting installations.

It is characterized mainly by the following four points, which can, moreover, be applied individually or in combination.

1. The constant speed of the film which is necessary for the correct reproduction of the moving pictures and of the accompanying sounds is, in accordance with this invention, secured by the regulation afforded to the electric motor moving the said film by electronic tubes and circuits which may be realized in accordance with all known processes.

2. During the passage from one picture to the following one the shutting of the light beam is obtained by means of an electrodynamic device composed of two electrodynamic motors each one of which controls and operates a shutter plate acting upon one half of the opening behind which the picture film is moved.

To that effect, the two motors are electrically connected in parallel, and they are acted upon by one common relaxation generator having an appropriate wave shape, the same being synchronized with the movement of the pictures through the unrolling of the film itself as it will be explained hereinafter.

3. The unrolling of the film being, indeed, continuous and uniform, the perforations of the film may be used so as to modulate a light beam which, through the intermediary of a photo electric cell and an amplifier, generates an alternating current which may be used for controlling the action of the electric motors operating the shutter plates.

4. Lastly, the mirror acting upon the beam and the moving image must be run in synchronism with the feeding speed of the pictures through the projector. According to my invention the operation of the mirror is under control thanks to the above mentioned alternating current.

The invention will be better understood by means of the accompanying drawings giving, by way of a non-limitative example, an embodiment thereof, and in which:

Figure 1 represents a magnetic control means for the control of the shutter;

Fig. 2 repreesnts a complete motion picture system arranged in accordance with the invention and showing an application of the shutter device of Fig. 1; and Fig. 3 is a theoretical diagram showing the manner in which the synchronization between the mirror and the shutter is brought about.

Referring to the drawings in detail, Fig. 1 represents one form of the shutter of my invention and of its control means, in which the obturation of the window 5 of the projector is insured by the plates 2 and 4 each simultaneously covering approximately one half of that window. The control means of these plates consist of two electrodynamic motors 1 and 3 whose movable bobbins 10 are integral respectively with the two shutter plates 2 and 4. These two motors are connected electrically in parallel, as indicated in Fig. 2.

Fig. 2 represents a complete scheme of the device according to the invention which enables the understanding of its operation. There is seen, in this figure, the film 14, moved by the motor 6, and guided by the slide-bar 26, which displaces itself before an opening facing the source of light 25 projecting the image on the oscillating mirror 13, revolving about the axis 23 and returning the pencil of light toward the objective 22. The film displaces itself likewise before an opening facing the auxiliary source 16 and a photoelectric cell 8, in such a way that the pencil of light originating from the source 16 excites the cell 8 through the perforations of the film 14. There results from this an alternating current of low frequency, whose frequency depends on the speed of unwinding of the film. This current is amplified by the amplifier 9, and a speed reducing device 15 that permits a frequency change from the frequency of the passage of perforations to the frequency of the images. This reduction may, incidentally, be avoided by producing a film whose lateral perforations follow one another at the rate of one perforation per image, located for example in the space between two successive images. Then, the current of the cell 8, thus amplified, actuates simultaneously and in synchronism two relaxation generators 11 and 12, the generator 11 producing short impulses, or pips, and the generator 12, sawtooth oscillations, as indicated in Fig. 3. The pips are then applied, through the intermediary of the distributor 21, to the two electrodynamic motors 10, so as to obturate the pencil of light by the shutters 4 and 2, as indicated in Fig. 1. On the other hand, the sawtooth oscillations are applied, through the intermediary of the distributor 20, to two other electrodynamic motors 10 actuating the mirror 13, the oscillations of the relaxors 11 and 12 being such that the pips actuating the shutter are produced during the period of rapid return of the mirror 13, as is indicated in the diagram of Fig. 3, where this correspondence has been shown by hatching the common zone delimiting the emission of the pips and the duration of the rapid return of the mirror.

While I have described my invention in certain of its preferred embodiments, I realize that changes in detail may be made and I intend no limitations upon my invention other than may be imposed by the scope of the appended claims.

What I claim is:

1. In an apparatus for projection of cinematographic films unwinding continuously using a mirror capable of movements of continuous rotation followed by rapid returns and a shutter stopping the projection during these rapid returns, a photoelectric cell, means disposed on the film for producing on the said cell light impulses of a frequency determined by the speed of unwinding of the film, an amplifier connected with the said cell, means for controlling the movement of the shutter, static means connected with the said amplifier for transforming the amplified electric impulses of the said cell into impulses of a suitable form, the said means being likewise connected with the means of control of the shutter, means for controlling the movement of the mirror, and static electric means connected with the said amplifier and synchronized by the amplified impulses of the said cell and connected with the means for controlling the movement of the said mirror.

2. In an apparatus for projection of cinematographic films unwinding continuously using a mirror capable of movements of continuous rotation followed by rapid returns and a shutter stopping the projection during the said rapid returns, a photoelectric cell, means disposed on the film for producing on the said cell light impulses of a frequency determined by the speed of unwinding of the film, an amplifier connected with the said cell, means for controlling the movement of the shutter, a generator of relaxation oscillations connected with the said amplifier and synchronized by the said impulses and connected with the means for controlling the movement of the shutter, means for controlling the movement of the mirror, and another generator of relaxation oscillations connected with the said amplifier and synchronized by the said impulses and connected with the means for controlling the movement of said mirror.

3. In an apparatus for projection of cinematographic films having perforations along their lateral edge and unwinding continuously and using a mirror capable of movements of continuous rotation followed by rapid returns and a shutter stopping the projection during the said rapid returns, a photoelectric cell excited by the light impulses determined by the passage of the perforations of the film, an amplifier connected with the said cell, a generator of impulses connected with the said amplifier and synchronized by the said impulses, means for controlling the movement of the shutter connected with the said generator of impulses, a generator of sawtooth oscillations connected with the said amplifier and synchronized by the said impulses, and means for controlling the movement of the said mirror.

4. Apparatus according to claim 3, in which the means for controlling the movement of the shutter comprise two electrodynamic motors having movable windings, each of the movable windings of the said motors being connected with the generator of impulses and being connected likewise with an obturating shutter, the said shutters closing half the window of the projector.

DANIEL CHARLES.

REFERENCES CITED

The following references are of record in the file of this patent:

UNITED STATES PATENTS

| Number | Name | Date |
|---|---|---|
| 1,713,663 | Kosken | May 21, 1929 |
| 1,968,938 | Goldhammer | Aug. 7, 1934 |
| 2,044,478 | Leventhal | June 16, 1936 |
| 2,107,039 | Leventhal | Feb. 1, 1938 |
| 2,215,464 | Dorgelo et al. | Sept. 24, 1940 |